Feb. 27, 1962 M. A. F. J. MANIÈRE ETAL 3,023,269

FREQUENCY AND PHASE SHIFT SYSTEM FOR THE TRANSMISSION OF CODED ELECTRIC SIGNALS

Filed March 26, 1959 2 Sheets-Sheet 2

United States Patent Office 3,023,269

Patented Feb. 27, 1962

3,023,269

FREQUENCY AND PHASE SHIFT SYSTEM FOR THE TRANSMISSION OF CODED ELECTRIC SIGNALS

Maurice Auguste Francois Joseph Manière and Roger Séverin Benoit-Gonin, Conflans-Sainte-Honorine, France, assignors to Lignes Telegraphiques & Telephoniques, Paris, France Filed Mar. 26, 1959, Ser. No. 802,149

Claims priority, application France June 9, 1958

12 Claims. (Cl. 178—2)

The present invention relates to a new system for the transmission of coded signals, for instance telegraph signals, coded data or the like, of the type in which intelligence transmission is effected through the agency of bivalent elementary signals of constant duration and occurring at regular time intervals. By "bivalent" signals are to be understood signals individually having one or the other of two possible signalling conditions, which may be, for instance, a positive or a zero direct-current value, a positive or a negative direct-current value, one or the other of two different carrier frequencies, etc. To simplify the language, these two signalling conditions, generally known as "mark" and "space," will be hereinafter referred to as "1" and "0" signals.

Like many known systems, the system of the invention is comprised of a transmitter, a transmission line or other transmission medium and a receiver. In the transmitter, the so defined 1 and 0 intelligence signals are derived from sequences of rhythmic coded D.C. pulses, delivered by a translating apparatus which translates into such D.C. pulses the intelligence directly supplied thereto from an external circuit or previously stored therein. These intelligence coded pulses have a substantially rectangular wave-shape and a constant duration which will be designated by the symbol T.

Also as in various known systems, the so-obtained coded signals are used to vary the frequency of a carrier wave with an average frequency $F_0$ higher than the reciprocal 1/T of their duration, in such a way that said carrier frequency assumes one or the other of two diferent values $F_1$ and $F_2$, according to the individual signalling condition of the successive pulses. As, in a well-balanced binary code, there are on the average as many signals of one signalling condition as of the other, the average frequency $F_0$ is obviously equal to the half-sum of $F_1$ and $F_2$.

However, the system of the invention differs from previously known systems in that it is capable of making use of two distinct types of frequency variation signalling, respectively known as coherent-phase and noncoherent phase; i.e. the transmitter includes such arrangements that a sudden jump in the instantaneous value of the carrier wave at the transition instants when the intelligence coded signals pass from one signalling condition to the other may exist or not according to which of said two types of signalling is used at the time considered. This means that, if different alternating current sources are used to supply the carrier wave signals of frequency $F_1$ and $F_2$ finally applied to the transmission medium, a proper phase relationship should be maintained by virtue of these arrangements between the respective output together with a proper timing of said transition instants with respect to the phase of said output signals. Methods for maintaining such phase and timing relationships are well known in the art.

The original character of the invention resides in the method and devices by which, at the receiving end of the system, demodulation of the non-coherent-phase signals is achieved.

The main feature of the invention is that, at the receiving end of the system, segregation of the two transmitted signal types is effected by an original selection means, which takes advantage of certain special properties of the instantaneous frequency of the signals. These properties are closely connected with the character of the above-mentioned phase transitions. In fact, the operation of the system of the invention relies on the appearance of extraneous frequencies generated when the non-phase-coherent received waves are properly amplitude-limited and frequency filtered. These extraneous frequencies are located outside the band of the transmitted waves and above or below the latter said band according to the sign—positive or negative— of the phase jumps in the original signals.

Although the system of the invention will be hereinafter described with the aid of an example of its embodiment more especially adapted to the case where two distinct kinds of intelligence are successively and respectively transmitted by the two above-mentioned modulation methods, it should be well understood that it is just a special application of its principle, and that the latter essentially resides in the particular way in which, at the receiving end of the system, non-coherent-phase signals are detected.

By way of example, in this particular application of the system of the invention, the intelligence messages constituted by the above-mentioned coded signal sequences, which may be fairly complicated and consist of a large number of elementary signals, cannot be properly interpreted, at the receiving end of the system, unless they are very accurately timed, as the meaning of the various signals or groups of signals in a given message is liable to change according to their time of occurrence or rank counted from the beginning of said message. As the time of arrival of a message at the receiver is generally not known in advance, a special group of coded signals, accurately timed with respect to the beginning of each message and known as the "start signal group,' is sent by the transmitter at the beginning of each message and previously to that of the intelligence signals proper. The receiving of this start signal group operates a timing circuit provided in the receiver, the purpose of which is to define a "time base" or, in other words, a time reference for the message. To this effect, identification of the start signal by the receiver causes a corresponding short duration pulse to be generated, which pulse in turn triggers the operation of said timing circuit.

In many known systems, the start signal group consists of a particular coded signal group, the comparison of which with a standard group previously registered in the receiver initiates the generation of said triggering pulse. However, a drawback of this method is that, if effective protection against accidental generation of a triggering pulse by noise from the transmission line or other disturbances is wanted, a fairly long and complicated start signal group must be used. This implies a certain amount of loss in the information transmission capacity of the system, as on one hand a valuable signal group is no longer available for intelligence transmission purposes and as, on the other hand, time is wasted for the transmission of a long start signal group.

An important feature of the just-mentioned embodiment of the invention is the provision of a start signal group including a small number of elementary signals shorter than and different from those used for intelligence transmission and which, although they are transmitted by frequency variation of the carrier wave like the intelligence signals, do not modulate said wave according to the coherent phase method. On the contrary, there are systematically introduced, at certain transitition instants between two successive of these elementary signals, sudden phase jumps which result in corresponding jumps in the instantaneous magnitude of the transmitted wave. At the receiving end of the system, these sudden phase and magnitude jumps are detected by a suitable circuit which derives therefrom a first control voltage which, together with a second control voltage derived from a subsequent part of the start signal group, consisting of longer and phase-coherent signals, operates the timing circuit of the receiving apparatus.

In the latter case, the method of the invention, applied to the transmission of messages consisting of start pulses followed by rhythmic coded intelligence pulses, the latter of which have a given constant duration and one or the other of two possible signalling conditions, comprises generating a start pulse group consisting of a number of pulses alternately having one and the other of said signalling conditions and a constant duration much shorter than said given duration, followed by at least two pulses having said given duration and different signalling conditions, transmitting in time succession the whole of said start pulses and intelligence pulses, generating two carrier waves of substantially equal amplitudes having a constant mutual phase and frequency relationship and a frequency difference equal to half the reciprocal of said shorter duration, transmitting for the duration of each one of said pulses one or the other of said carrier waves according to the signalling condition thereof, combining said transmitted waves into a resultant wave having respective coherent-phase and non-coherent phase conditions for said longer and shorter duration pulses, frequency filtering said resultant wave so as to alter its modulation characteristics for the portion thereof corresponding to said shorter pulses, amplitude-limiting said filtered wave, demodulating on one hand said amplitude-limited wave for its frequency and on the other hand subjecting said amplitude-limited wave to further frequency selective filtering and demodulating said further frequency filtered wave, and deriving on one hand timing signals from latter said demodulated wave and on the other hand further timing signals and intelligence signals from said frequency-demodulated wave.

In a preferred variant of this method, the value of said frequency difference of said waves is chosen equal to the reciprocal of the duration of the coded intelligence pulses, i.e. the duration of the latter pulses is chosen equal to twice that of the shorter pulses.

The operating principle of the invention is that, by the first above-mentioned frequency filtering, the width of the frequency spectrum of the frequency-modulated wave is so restricted that, in the case of the shorter pulses, the carrier wave of which is not phase-coherent, both amplitude and frequency modulations appear in said wave which, although initially purely frequency-modulated, so acquires much altered modulation characteristics, as will be seen later on. This filtering can be effected at the transmitting end or at the receiving end of the system, or at both of them. It has been found convenient to select for said filtering a bandwidth slightly exceeding the reciprocal of the individual duration of the shorter pulses.

On the contrary, in the case of the longer pulses, because of the coherent-phase condition and equal amplitudes of both carrier waves, the resultant wave behaves like a true frequency-modulated wave, the spectral composition of which is not much altered by the mentioned frequency filtering, as for the longer pulses the ratio of the bandwidth of the filter to the reciprocal of the pulse duration is much higher than in the case of the shorter pulses.

The invention also provides for a transmission system comprising a transmitter, a transmission circuit and a receiver and in which, in said transmitter, said non-phase-coherent and phase-coherent carrier waves are obtained from a pair of alternating current sources of different frequencies $F_1$ and $F_2$ having a constant phase relationship and both frequencies of which are integer multiplies of a common frequency derived from a basic frequency source; said common frequency is given a value equal to the reciprocal of the duration of the elementary intelligence pulses and both durations of the latter and of the shorter pulses are also controlled by said basic frequency source. Said basic frequency source also provides clock pulses for the operating of a timing device controlling the transmission of said start and intelligence pulses, which in turn control keying devices transmitting said alternating currents toward said transmission circuit.

In a preferred embodiment of this system, said alternating currents of frequencies $F_1$ and $F_2$ are obtained in the transmitter from an assembly of frequency dividers and multipliers fed from a basic frequency source. This makes it possible to easily obtain carrier waves of frequencies $F_1$ and $F_2$ equally spaced from a middle frequency $F_0$ and having a well-defined frequency and phase mutual relationship. At the same time, coherent and non-coherent phase conditions for the waves corresponding to the longer and shorter coded pulses are also easily obtained in a very simple manner by controlling the respective durations of said pulses by said basic frequency source in such a way that the duration of the longer pulses includes an odd integer number of full periods of the frequency $(F_2—F_1)$ and that the duration of the shorter pulses includes half that integer number of said periods.

The receiver part of the system essentially comprises a first band-pass filter followed by a limiting amplifier, a frequency discriminator fed from the output of said limiting amplifier, an amplitude detector fed from said output of said limiting amplifier through a second band-pass filter having its pass-band external to that of said first band-pass filter, a receiving apparatus including a timing control input and an intelligence input, means for deriving from the output of said amplitude detector timing signals and for applying them to said timing control input, means for deriving from the output of said discriminator further timing signals and for applying them to same said timing control input and means for deriving from said output of said discriminator intelligence signals and for applying them to said intelligence input.

Also in a preferred embodiment of the invention, the receiver of the system includes an integrating circuit connected to the output of said amplitude detector and delivering at its output a time integrated voltage. When the latter voltage, at the end of a fixed time interval, reaches a predetermined value corresponding to the integration of a predetermined number of short start pulses, it operates a threshold device, the output voltage of which is applied as a first control voltage to one of the inputs of a bistable circuit provided with first and second control inputs and an output. This causes said bistable circuit to pass to one predetermined of its two stable conditions. At a later time, a second control voltage is derived from the subsequent part of the start signal group, which consists of frequency-modulated signals having the same duration as the intelligence signals and so appears in the form of frequency-demodulated signals received at the output of said discriminator. The latter voltage is applied, preferably through a time differentiator circuit, to the other input of said bistable circuit, which causes the latter to pass to the other of its stable conditions and to generate a triggering pulse. A connection between the output of said bistable circuit and said timing control input transmits said triggering pulse thereto, to operate the timing circuit of said receiving apparatus.

In a variant of embodiment of the invention, the receiver also comprises, in addition to the already mentioned elements, an adjustable attenuator for adjusting the level of the signals applied to the input of the abovesaid first band-pass filter. The signals from the output of said discriminator are filtered in a low-pass filter, amplified and amplitude-limited in an amplifier, and thereafter directed toward the receiving apparatus (such as a telegraph apparatus, a logic circuit, or other apparatus for the utilization of coded intelligence signals) through a gate device, the gating of which is controlled by an additional bistable circuit, itself controlled by timing pulses delivered by the above-mentioned timing circuit at definite times before the beginning of the intelligence signals and at the end of the message. In this manner, said gate device is successively rendered operative at the beginning of the intelligence part of a message and inoperative at the end thereof.

In a similar manner, the rectified current from said detector is filtered by a low-pass filter, amplified in an amplifier and thereafter applied to the input of the above-mentioned integrating circuit.

In the hereinafter given example of embodiment of the invention, it will always be supposed that frequencies $F_1$ and $F_2$ are respectively equal to 1125 and 1875 c./s., and that duration T equals $\frac{1}{750}$ of a second, but this should not be understood as a limitation of the scope of the invention.

The theory of the operation of the system of the invention will be explained with reference to two important papers by B. Van der Pol, relating to the principles of frequency modulation. The first of these papers, published in the review "Proceedings of the Institute of Radio Engineers," vol. 18, July 1930, pp. 1194–1205, describes important properties of the frequency spectra of frequency-modulated coded signals, more particularly taking in consideration the dependence of said spectra on the frequency-shift to keying speed ratio of said signals. The second paper, published in the British review "Journal of the Institution of Electrical Engineers," vol. 93, part III, May 1946, pp. 153–158, gives some very important definitions relating to such mathematical quantities as the instantaneous amplitude and frequency of a complex signal, together with a study of their properties.

Other important features and advantages of the invention will be better understood from the following description, given with reference to the annexed drawings, of which:

Figure 1:
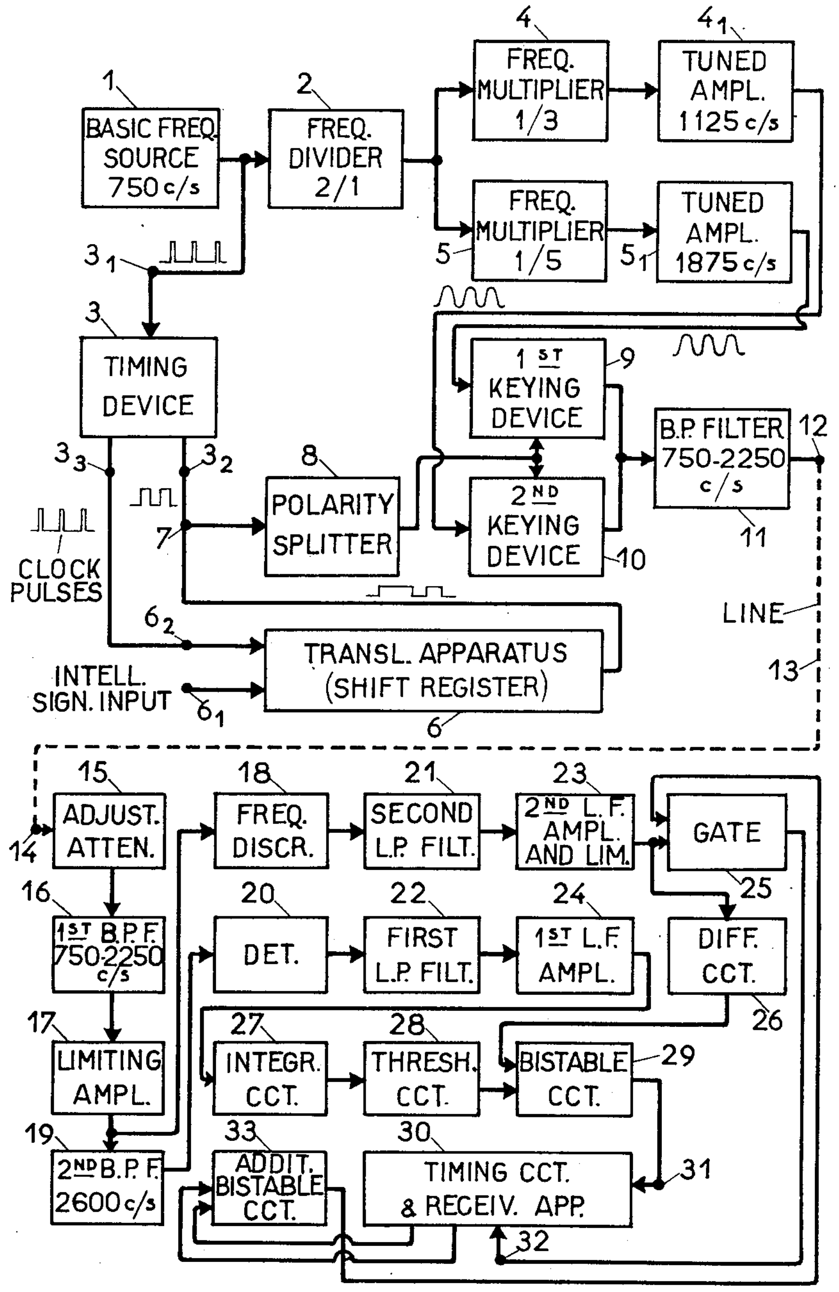
FIG. 1 is a general diagram of a transmission system according to the invention.

Referring now to FIG. 1, the transmitter part of the system of the invention is shown at the upper part of the figure, and its receiver part at the lower part thereof. The transmission line 13 provides interconnection between said transmitter and receiver parts. A stable pulse source 1 with a basic frequency of 750 c./s. (cycles per second), equal to the reciprocal of the duration T of the desired rhythmic coded signals, feeds a frequency divider 2, which delivers at its output periodic signals having half that frequency, i.e. the frequency of which is 1/2T or 375 c./s. The latter frequency is multiplied by three and five respectively in the frequency multipliers 4 and 5, the outputs of which deliver signals of frequencies $F_1$ and $F_2$, respectively equal to 1125 and 1875 c./s., to the inputs of tuned amplifiers $4_1$ and $5_1$, which deliver at their respective outputs sinusoidal signals of the same frequencies and having substantially equal amplitudes. Said frequency divider and multipliers operate in such a way that a constant mutual phase relationship is maintained between the signals of frequencies $F_1$ and $F_2$. Such a condition is easily fulfilled in various devices known in the art.

At the same time, the basic frequency source 1 controls the operation of a timing device 3 operating like a clockwork and the function of which is to suitably stagger in time the transmission of the coded signals. This timing device operates in a known manner according to a duty cycle corresponding to the duration of a whole message and defined from clock pulses regularly recurring at time intervals T and supplied thereto by source 1.

During the first part of its duty cycle, said timing device, under the influence of said periodic clock pulses applied to its input $3_1$, delivers at its first output $3_2$ a sequence of start signals, preferably of rectangular wave shape, consisting of a predetermined even number of alternate "0" and "1" signals each having a duration T/2 equal to half the time interval between two successive clock pulses. From $3_2$ said start signals are directed toward the input 7 of a polarity splitter 8, the function of which will be explained later on. After the required number of such signals has elapsed, said timing device automatically changes its mode of operation and, after a time interval equal to zero or to an integer multiple of T, delivers at $3_2$ at least one signal of duration T of each one of the two signalling conditions, completing the start signal group. The latter signals are also directed from $3_2$ toward 7.

Figure 2:
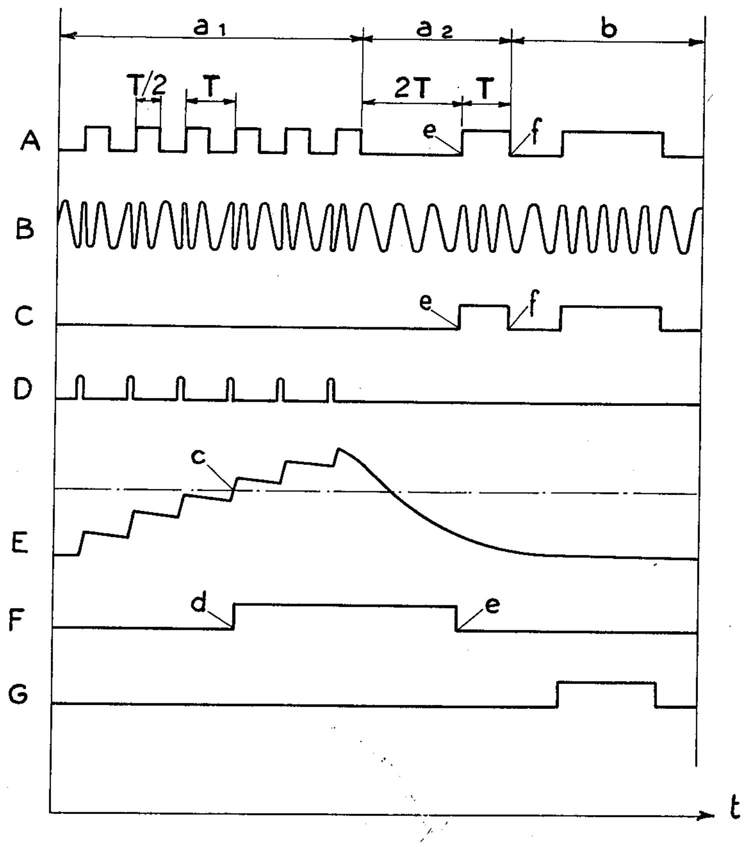
FIG. 2 shows the wave shapes of the signals at various points of the system of the invention.

The wave shape of the complete start siganl group has been represented as a function of time at line A of FIG. 2, covering a total time interval designated by $(a_1+a_2)$ in said figure, where the first succeeding intelligence signals are shown at *b*.

At the end of said start signal group, said timing device 3 automatically changes its mode of operation again and delivers at its second output $3_3$ further clock pulses which are directed toward the input $6_2$ of a translating apparatus 6 in order to control the operation thereof. The function of the latter apparatus, which may be of the type known as a "shift register" or of any other conventional type, is to store intelligence coded signals delivered at some previous time and in more or less irregular time succession to its intelligence input $6_1$, and thereafter, under the action of the clock pulses from $3_3$ applied to its control input $6_2$, to release properly timed correspondingly coded rhythmic signals of constant duration T which are directed toward the input 7 of the already mentioned polarity splitter 8.

Start signal sfrom 3 and rhythmic coded signals from 6 are thus successively applied to the input 7 of this polarity splitter 8, the output of which controls the operation of the keying devices 9 and 10, to the inputs of which sinusoidal signals of frequencies $F_1$ and $F_2$ are respectively delivered by the outputs of the tuned amplifiers $4_1$ and $5_1$.

The function of 8 is, when rectangular wave shape "1" and "0" signals from 3 or 6, respectively consisting, for instance, of positive D.C. and zero signals are applied to its input 7, to transform them into equal amplitude positive and negative D.C. signals, respectively. However, the polarity splitter 8 can be omitted if the signals delivered by 3 and 6 are already positive and negative signals, or if signals of alternate polarities are not necessary for the alternate operation of the keying devices 9 and 10, the part played by which will now be explained.

As it may be seen on FIG. 1, sinusoidal carrier waves of frequencies $F_1$ and $F_2$ (1125 and 1875 c./s.) from the outputs of amplifiers $4_1$ and $5_1$ are applied to the respective carrier wave inputs of said keying devices 9 and 10.

According to the signalling condition of each one of the signals supplied by 8 to the control inputs of 9 and 10, only one of said keying devices is rendered operative at a time. In that way, keyed carrier wave signals of one or the other frequency $F_1$ or $F_2$ appear at the input of a band-pass filter 11 with a 750–2250 c./s. pass-band which is connected to both outputs of 9 and 10. The function of 11 is to filter out undesirable frequency components in the keyed carrier wave signals, finally directed at 12 to the transmitting end of line 13.

From the first above-mentioned paper by Van der Pol, it is known that the frequency spectra of these signals are constituted as follows:

Assuming the keyed signals to consist, for instance, of regularly alternating "1" and "0" signals (i.e. of the type of telegraph signals commonly known as "reversal"), the spectrum of the intelligence coded signals, the duration of each one of which is equal to T $\frac{1}{750}$ of a second or 1.33 milliseconds) and consequently to half the reciprocal of the average frequency ($F_0=(F_1+F_2)/2=1500$ c./s.), comprises a main component at 1500 c./s. and a number of components with frequencies $F_0 \pm nf_0$, where $f_0$ equals $1/2T$ or 375 c./s. $n$ being any integer number. Practically, it has been found that, to obtain frequency-modulated signals retaining a satisfactory wave shape after their demodulation, it is sufficient to retain only the spectral components corresponding to $n=1$ and $n=2$. In the device of FIG. 1, the pass-band of filter 11 has thus been limited to 750 and 2250 c./s.

From the above-given values for T, $F_1$ and $F_2$ it also results that the intelligence coded signals are "phase-coherent," i.e. that there is no sudden change in their magnitude at the transition instants from a "1" signal to a "0" signal or conversely. This is due to the fact that, as the duration T of an elementary signal is equal to 1/750 of a second, and as frequencies $F_1$ and $F_2$ are respectively equal to 3 and 5 times 375 c./s., the numbers of half-cycles of the corresponding carrier waves which elapse during a time interval T differ by two, i.e. one full cycle. If the phases of the corresponding alternating current waves are so adjusted that they be the same at any one of said transition instants, they remain the same at any other transition instant.

The coherent wave shape of the carrier-wave intelligence signals is clearly shown at the right end of line B of FIG. 2, where the time interval $b$ includes some of said intelligence signals, while the part of line B immediately at the left of $b$ shows in a $a_2$ the wave shape of the last elements of the start signal group, which also benefit the same coherent phase property.

Considering now the initial elements of the start signal group, shown at $a_1$ on line A of FIG. 2, i.e. the alternate "1" and "0" signals of duration $T/2$, they obviously do not benefit the same advantage, as the respective numbers of half-cycles corresponding to frequencies $F_1$ and $F_2$ and elapsing during a time interval $T/2$ differ by one half-cycle. For this reason, if the relative phases of the two carrier waves are so adjusted that they be the same at a given transition instant, when passing for instance from a "0" to a "1" signal, they are in phase opposition at the next reverse transition instant. After an even number of transitions, said carrier waves become in phase again.

The non-coherent phase character of the carrier waves in the case of the signals of duration $T/2$ is clearly shown at the left part of line B, FIG. 2, during the time interval $a_1$ during which such waves are transmitted. From the non-coherent phase character of these waves, it results that they must be considered as consisting of two distinct waves of carrier frequencies $F_1$ and $F_2$, keyed at frequency $1/T$ or 750 c./s. The telegraph modulation of said waves generates two series of sidebands, the frequencies of which may be respectively represented by $F_1 \pm 2nf_0$ and $F_2 \pm 2nf_0$, $n$ being any integer number and $f_0$ being equal to 375 c./s. as formerly. Owing to the particular choice of $F_1$, $F_2$ and $f_0$, the first lower sideband of $F_2$ has a frequency equal to $F_1$, and the first upper sideband of $F_1$ has a frequency equal to $F_2$. The frequencies of the next lower and upper sidebands are 375 c./s. and 2625 c./s. If filtering means are provided for limiting the frequency band of the transmitted waves to 750–2250 c./s., the only components left in the case of the signals of duration $T/2$ are those having frequencies $F_1$ and $F_2$. Calculation shows that their amplitudes are necessarily different, at least in the here considered frequency, duration and filtering conditions.

A theoretical explanation of the operation of the receiver at the lower part of FIG. 1 can be given with the help of some notions developed in the second Van der Pol paper. The most important of these is that of the instantaneous frequency of a signal, the instantaneous magnitude of which is a function of time. If a constant amplitude but variable frequency sinusoidal carrier wave signal is considered—which will be assumed to be the case of the actual signals in the system of the present invention—said instantaneous frequency is equal to the quotient by $2\pi$ of the time derivative of the signal phase.

The time variation of the instantaneous frequency of the carrier-wave transmitted to line 13 of FIG. 1 has been calculated as a function of time for the case of the reversal signals of durations T and $T/2$ (1.33 and 0.06 milliseconds) shown at line B of FIG. 2, respectively. Due account has been taken of the distortion introduced in the wave by its passing through filter 11 (FIG. 1). While for the longer signals the instantaneous frequency fluctuates about 1500 c./s., its extreme values not much differing from the nominal carrier frequencies $F_1$ and $F_2$ (1125 and 1875 c./s.), on the contrary, it has been found that, for the shorter signals, the instantaneous frequency always remains higher than 1500 c./s. and assumes very high values at every second transition instant between said signals, i.e. at the instants when the carrier wave suddenly passes from frequency $F_1$ to frequency $F_2$, assuming the respective phases of the waves delivered by amplifiers $4_1$ and $5_1$ (FIG. 1) to be so adjusted that no phase discontinuity occurs at the reverse transition instants.

Referring now again to FIG. 1, the receiver of the transmission system of the invention is shown at the lowest part thereof. Signals transmitted through line 13 are received at the input 14 of an adjustable attenuator 15, the output of which is connected to the input of a first band-pass filter 16 with a 750–2250 c./s. pass-band, the output of which feeds the input of a limiting amplifier 17. From the output of 17, the signals are directed toward two parallel transmission paths, which will be respectively described as the intelligence signal and the start signal paths. The former path comprises a frequency discriminator 18 (centered at the middle frequency $F_0$, i.e. 1500 c./s., of the received carrier wave signals). The output of said discriminator is connected through a second low-pass filter 21 to the input of a low-frequency amplifier-limiter 23 which amplifies the coded intelligence signals demodulated in 18 and limits their amplitude, after their high frequency components have been eliminated by 21. The output of amplifier 23 is connected through a gate device 25 to the coded signal input 32 of a receiving apparatus 30, which is the working apparatus for the final utilization of the coded intelligence signals. The mode of operation and purpose of said gate device will be explained later on.

The start signal path of the receiver will now be described. Said start signal path comprises a second band-pass filter 19, the pass-band of which is centered at a frequency (2600 c./s. in the case of FIG. 1) higher than and external to the pass-band of above-said filter 16. The purpose of this arrangement is to avoid propagation of the intelligence signals, the frequency of which has been limited to 750–2250 c./s. by filters 11 and 16, toward the start signal path. From the output of limiting amplifier 17, the signals are directed toward the input of said second band-pass filter 19, the output of which feeds the input of an amplitude detector 20.

The constitution of the waves applied to the input and delivered at the output of detector 20 must now be examined. As already mentioned, the frequency spectrum of the carrier wave modulated by the start signals of duration $T/2$ (equal to 1/1500 of a second) and filtered through 16 includes two main components of noticeably different amplitude at frequencies $F_1$ and $F_2$ (1125 and 1875 c./s. respectively).

As already explained, it results therefrom that this wave has both amplitude and frequency modulations, with an instantaneous frequency always higher than the middle frequency $F_0$ of 1500 c./s. and taking very high values at the phase jump instants shown at line B, FIG. 2, regularly recurring at 1/750 of a second time intervals. After its being clipped in the limiting amplifier 17 (FIG. 1), the transmitted wave has a practically constant amplitude but a widely and rapidly varying instantaneous frequency, periodically passing through any particular value, for instance 2600 c./s., in a wide frequency band above 1500 c./s.

The amplitude of the wave appearing at the output of the second band-pass filter 19 (which may be, for instance, a single resonant circuit tuned to 2600 c./s. as shown in FIG. 1), consequently undergoes sudden variations at said phase jump instants and corresponding short duration D.C. pulses are delivered at the output of detector 20. The wave shape of said pulses is shown (except for their polarity, which has arbitrarily been assumed positive) on line D of FIG. 2.

It should also be pointed out that in the case of the shorter signals, the wave delivered at the output of the limiting amplifier 17 and applied to discriminator 18 does not trouble the operation of the intelligence signal path 18, 21, 23. As its frequency always remains higher than $F_0$, it causes a single polarity D.C. signal to appear at the output of 18, which signal, after being clipped in 23, reduces to a constant D.C. signal which does not affect said operation.

The short pulses from the output of 20 are directed, through a low-pass filter 22 eliminating the higher spurious frequencies, toward the input of a low-frequency amplifier 24, the output of which controls the integrating circuit 27. The function of the latter circuit, which may be of any conventional type, is to transform the pulse sequence represented on line D, (FIG. 2) into a step-shaped signal, the wave shape of which is shown on line E in FIG. 2. This is obtained, in a known manner, by the charging of a condenser by a current proportional to the voltage of the successive pulses shown on line D, the discharge circuit of said condenser having a time constant long enough to prevent the voltage developed across said condenser to noticeably decrease between two successive charging pulses. When a sufficiently high charging voltage has been reached, as shown at point $c$ of FIG. 2, the output of the integrating circuit 27 operates a threshold D.C. amplifier or other threshold circuit 28, which delivers a triggering voltage to one of the control inputs of a bistable circuit 29.

The threshold level of 28 is so selected that if, for instance, the start signal group includes eight pulses, said threshold level is reached after six pulses only. In this manner, while on one hand an isolated noise pulse is unable to cause untimely operation of said threshold circuit, on the other hand accidental failure of a regular pulse does not prevent said operation but just somewhat delays it.

Circuit 29, which may be a two-stable state multivibrator or the like, is provided with two control inputs and an output. When said bistable circuit 29 is triggered, for instance by a sufficiently high positive voltage (as that shown at $c$, FIG. 2) applied to one of its control inputs, it assumes one determined of its two possible stable states, whether it already was in the latter state or not. Assuming such a condition not to have prevailed before, the D.C. output voltage of 29 (shown at line F, FIG. 2) suddenly changes its value (as shown at point $d$ of said line F). Thereafter 29 remains in the same stable condition until it be brought back to its previous condition by a subsequent pulse applied to its other input.

The output of 29 is connected to the timing control input 31 of the receiving apparatus 30 which, as already mentioned, is provided with an internal timing circuit. This timing circuit includes a time differentiator circuit which derives from the voltage applied to said timing control input a positive or negative pulse when said voltage suddenly changes its value, according to the positive or negative direction of the change. However, in the present case, things are so arranged that a positive pulse applied to said timing control input 31 of 30 has no action thereon, the sudden change intervening at point $d$ of line F (FIG. 2), having for its only purpose to put 29 in a suitable condition, as just explained.

Referring now again to FIG. 2, it is seen on the latter that the complete start signal group, the total duration on which is shown at $(a_1+a_2)$, comprises after a "0" signal with a duration equal to T or to a multiple thereof (2T in the case of FIG. 2), a further "1" signal, shown on FIG. 2 with a duration T. As the latter signal has a duration and a frequency spectrum identical with those of the intelligence coded signals, it is not transmitted through the start signal path, but through the intelligence path, and thus appears at the output of amplifier 23 with a practically unaltered wave shape. From the output of 23, said signal of duration T is applied to a time differentiator circuit 26. The wave shape of the signal delivered at the output of discriminator 18 (FIG. 1) during the time intervals $a_2$ and $b$ of line A, FIG. 2, is shown on line C of this figure, while the wave shape of the intelligence signals finally received at the output of the gate device 25 of FIG. 1 is shown on line G of FIG. 2. From the output of 23, said signal of duration T is applied to a time differentiator circuit 26 which, because of the sudden transition (shown at point $e$, line A, FIG. 2) occurring at the beginning of said signal, generates a short duration pulse. This pulse (selected of a suitable polarity) is applied to the second control input of circuit 29 (FIG. 1) and causes it to return to its initial condition. The passing of 29 to the latter condition causes its output voltage, applied to the timing control input 31 of apparatus 30, to suddenly change. Inside the timing control circuit of 30 a new pulse is generated, with an opposite polarity to that of the pulse generated at the previous change in the condition of 29. This new pulse initiates the operation of the timing circuit of 30 and so puts the receiving apparatus in a suitable condition for receiving the intelligence signals.

The time interval remaining between points $e$ and $f$ of line A (FIG. 2), the latter of which is the beginning of the intelligence signals proper, is taken advantage of to operate the above-mentioned gate device 25 (FIG. 1). This device, which may be of any conventional type, is inserted between the output of the intelligence signal amplifier 23 and the intelligence input of receiving apparatus 30; it has a signal input, a control input and an output and is so arranged that it does not transmit signals unless a suitable D.C. bias voltage is applied to its control input (for instance, 25 may consist of an assembly of biassed diodes, electron tubes or the like). When the operation of the timing circuit of 30 has been initiated, said timing circuit delivers a control pulse to one of the inputs of an additional bistable circuit 33, which passes to such one of its two stable states that its output delivers said D.C. bias voltage to the control input of said gate device 25. At the end of each message, a corresponding pulse is sent from said timing circuit, by a suitable connection, to the second input of circuit 33 and brings it back to the other of its stable states, which so changes the condition of 25 that it becomes unable to transmit further signals. The whole assembly of FIG. 1 is then ready to receive a new message.

Some advantages of the system of the invention are the following:

Although the start signal group requires but a small number of elementary signals, the systems affords excellent protection against noise or other disturbances, as it requires only a comparatively narrow frequency band, the filters retaining only the more important components of the frequency-modulated signals.

The integrating circuit provided in the start signal path of the receiver integrates the start signals in such a manner that a certain number of said signals must be received before the timing circuit of the receiving apparatus operates, which together with the above-explained choice of the threshold level of the subsequent threshold circuit avoids untimely operating of said timing circuit by isolated noise pulses occurring at irregular time intervals.

What is claimed is:

1. A transmitting system using frequency modulated bivalent coded signals having one of two given frequencies according to their coding condition and part of which are non-phase-coherent signals presenting a sudden phase jump when passing from one to the other of said frequencies, comprising a communication link, including a transmitter, a transmission medium and a receiver, frequency filtering means in said link having a passband including both said frequencies, means in said receiver for applying signals filtered through said filtering means to the input of an amplitude limiter, means for applying limited signals including extraneous frequencies generated by the non-linear action of said limiter and received at the output of said limiter to the input of a frequency selective means having a passband located outside that of said filtering means but including at least part of said extraneous frequencies, means for applying signals from the output of said frequency selective means to an amplitude detector, and means for impressing rectified current from said detector upon a working circuit.

2. A transmission system as claimed in claim 1, using both non-coherent-phase and coherent-phase signals for transmitting distinct kinds of intelligence.

3. A transmission system as claimed in claim 2, wherein said receiver comprises further means fed from the output of said limiter for frequency demodulating coherent-phase frequency-modulated coded signals having one of said two given frequencies according to their coding condition and for directing said frequency demodulated signals toward a further working circuit.

4. A transmission system as claimed in cliam 1, wherein said given frequencies are different integer multiples of a common frequency derived from a basic frequency source.

5. A transmission system as claimed in claim 4, wherein non-coherent and coherent phase signal conditions are obtained by giving different durations to non-coherent and coherent phase signals respectively.

6. A transmission system as claimed in claim 4, wherein said non-phase coherent coded signals have a duration substantially equal to half that of said phase-coherent coded signals.

7. A transmission system as claimed in claim 4, wherein said common frequency is derived from said basic frequency source by a frequency divider, and wherein said given frequencies are derived from said common frequency by frequency multipliers.

8. A transmission system as claimed in claim 7, wherein said given frequencies are respectively obtained from said multipliers through further filtering means respectively tuned to each one of latter said frequencies, and wherein said filtering means include at least one bandpass filter the passband of which has a middle frequency substantially equal to the half-sum of said given frequencies and the bandwidth of which slightly exceeds the spacing between latter said frequencies.

9. A transmission ssytem as claimed in claim 1, wherein said filtering means comprise a bandpass filter included in said transmitter.

10. A transmission system as claimed in claim 1, wherein said filtering means comprise a bandpass filter included in said receiver.

11. A transmission system as claimed in claim 1, wherein non-coherent and coherent phase signals of said two given frequencies are respectively used for transmitting receiver timing signals and information carrying signals.

12. A transmission system as claimed in claim 1, wherein non-coherent and coherent phase coded signals of same said two given frequencies are respectively used for transmitting first and second kinds of intelligence, and wherein the input of said frequency selective means is in parallel connection with the input of a frequency discriminator, the outputs of said detector and discriminator being respectively connected to said working circuit and to a further working circuit respectively utilizing signals corresponding to said first and second kinds of intelligence.

References Cited in the file of this patent

UNITED STATES PATENTS

| | | |
|---|---|---|
| 2,502,154 | Jeffers | Mar. 28, 1950 |
| 2,866,161 | Davidoff | Dec. 23, 1958 |
| 2,874,216 | Scuttio | Feb. 17, 1959 |